(12) United States Patent
Chimienti

(10) Patent No.: US 6,267,083 B1
(45) Date of Patent: Jul. 31, 2001

(54) ANIMAL SUPPORT GARMENT

(76) Inventor: Pat Chimienti, 2047 N. Vista, Fresno, CA (US) 93722

( * ) Notice: Subject to any disclaimer, the term of this patent is extended or adjusted under 35 U.S.C. 154(b) by 0 days.

(21) Appl. No.: 09/426,115

(22) Filed: Oct. 22, 1999

(51) Int. Cl.⁷ .................................................. A01K 13/00
(52) U.S. Cl. ............................................................ 119/850
(58) Field of Search ................................. 119/809, 814, 119/815, 850, 856; 54/79.1, 79.4; 450/94, 114, 143

(56) References Cited

U.S. PATENT DOCUMENTS

| | | | |
|---|---|---|---|
| 3,895,628 | 7/1975 | Adair | 119/850 |
| 4,385,592 | 5/1983 | Goldstein | 119/850 |
| 4,510,888 | 4/1985 | DeAngelis et al. | 119/856 |
| 5,003,756 | * 4/1991 | Mazzota, Sr. | 54/79.1 |
| 5,137,508 | * 8/1992 | Engman | 119/850 |
| 5,426,925 | 6/1995 | Smargiassi | 54/79.1 |
| 5,537,954 | * 7/1996 | Beeghly et al. | 119/850 |
| 5,924,388 | * 7/1999 | Peeples | 119/814 |
| 5,996,537 | * 12/1999 | Caditz | 119/850 |
| 6,199,635 | * 9/2000 | Powell-Lesnick | 119/850 |

* cited by examiner

Primary Examiner—Charles T. Jordan
Assistant Examiner—Elizabeth Shaw
(74) Attorney, Agent, or Firm—Mark D. Miller

(57) ABSTRACT

Disclosed is a unique spinal support garment for use by dachshund dogs and other four-legged animals having elongated spines. The garment is in the form of a flexible body wrap that is provided with a plurality of removable longitudinal support pieces that fit into parallel pockets located on the back of the garment. The garment has openings for the neck and front legs of the animal, and a pair of flexible anchors for attachment to the rear legs. When worn by an animal such as a dachshund, support pieces in the garment provide the same kind of support for the animal that is provided by the animal's spine, thereby relieving stress and pressure from the spine itself.

7 Claims, 5 Drawing Sheets

ANIMAL SUPPORT GARMENT

BACKGROUND OF THE INVENTION

1. Field of the Invention

The present invention relates to support garments for animals, and in particular to an over garment for use by a dachshund or other four-legged animal to provide comfort and support to the spine.

2. Description of the Prior Art

Humans have provided sweaters, scarves, body blankets, and other garments for use by animals for many years. Horses are provided with close fitting blankets for warmth. Dogs and other animals have been provided with similar garments for the same purpose. In addition, medical shields, splints, braces and coverings have also been adapted for use by animals. Examples are found in U.S. Pat. No. 4,510,888 which describes a cylindrical splint for use on the leg of a dog; U.S. Pat. No. 3,895,628 which describes a body encompassing bandage that may be wrapped around an injured dog to aid in healing; and U.S. Pat. No. 4,385,592 which describes a cervical brace for use by a dog following surgery.

It is also well known that dachshunds and other dogs and four-legged animals having elongated spines suffer from gradual degeneration of the spine over the course of time. For such animals, simple daily walking can lead to early problems with spinal vertebrae and can bring on early arthritis. These are painful maladies that can cause the afflicted animal to discontinue daily exercise, which can lead to a whole host of other medical problems. The most common treatment for animal back problems is either the use of medication, which can have adverse side effects on the animal, or an operation in which success is by no means guaranteed. Moreover, these medical treatments would not be expected to prevent the recurrence of the same spinal problem. It is therefore desirable to provide a means by which these animals might prevent or forestall the spinal problems associated with their species, and to more effectively treat those already afflicted with spinal problems.

SUMMARY OF THE INVENTION

The present invention provides a unique support garment for use by dachshund dogs and other four-legged animals having elongated spines. The garment is in the form of a flexible body wrap or jacket that is provided with a plurality of removable longitudinal support pieces. The jacket has openings for the neck and front legs of the animal, and a pair of flexible anchors for attachment to the rear legs. The portion of the garment which stretches across the back of the animal is provided with a plurality of longitudinal pockets into which corresponding support slats or stays may be removably inserted. When worn by an animal such as a dachshund, the positions of the support stays are generally parallel to the spine of the animal, and the garment is sized to fit the animal snugly. In this way, the stays in the garment provide the same kind of support for the animal that is provided by the animal's spine. This relieves considerable stress and pressure from the animal's spine. Accordingly, the garment may be used preventatively to prolong the onset of spinal problems, or it may be used to treat such problems after they have become symptomatic.

In use, the garment is first sized so that it fits the animal snugly. This is important in order to achieve the stress-relief to the animal's spine. The garment includes a large piece that fits around the animal and is stitched or otherwise fastened together along a seam to form a single sleeve. A neck opening is provided at the front end of the sleeve, and a large rear body opening is provided at the other end. A pair of smaller openings are provided for the front legs, and a pair of flexible loops are attached at the rear body opening for engagement with the rear legs of the animal in order to anchor the rear of the garment. The entire garment sleeve is pulled over the animal so that the head and neck extend through the front opening, and the front legs are inserted through the smaller openings in the garment. The flexible loops are then pulled around the rear legs of the animal. While the garment covers the lower chest area of the animal, the wide opening in the rear leaves plenty of room for the animal to urinate or defecate while wearing the garment.

The garment should be snugly pulled over the animal such that the plurality of longitudinal pockets on the outside of the garment are positioned generally parallel to the direction of the animal's spine. These pockets are elongated and positioned in parallel to each other. Each pocket may have a different length, but all of the pockets extend in a longitudinal direction from the front of the garment to the rear. The longest pockets are preferably those which are most centrally located immediately adjacent to the animal's spine, along the top of the garment when it is fitted over the animal. Shorter pockets are preferably provided in parallel with the longer pockets down each side of the garment, and hence down the sides of the animal. The number of pockets used depends upon the size of the pockets themselves (and the stays which fit into them). the size of the garment used, the size of the animal, and the amount of support desired. Larger pockets with larger stays provide more support, but take up more room than smaller pockets with smaller stays.

Once the garment is positioned on the animal, one or more of the support stays may be slidably inserted into the pockets. The stays should be made of a rigid material in order ot provide proper support; however, they should also have some amount of flexibility in order not to immobilize the animal. Rigid or semi-rigid plastic is preferred, although wood or metal may also be used. One or two stays may be all that is required for a small animal, or for an animal that is not presently experiencing any discomfort. Additional or stiffer stays may be inserted into the pockets to provide additional support for larger animals, or animals showing signs of fatigue. While additional or stiffer stays will provide additional support, they will also reduce the mobility and flexibility of the animal. Each of the pockets is open at one end, and closed at the opposite end. A fold over flap is provided to cover the open ends of the pockets to prevent the stays from sliding out once they have been inserted.

In an alternative embodiment, an area of reinforcement may be provided on the garment where the pockets are located to provide additional support. The reinforcement may take the form of additional layers of thick fabric below the pockets, or it may include a sheet of rigid material sewn between the fabric layers beneath the pockets. This embodiment may be used with or without the stays. Without the stays it would rely on the reinforcement alone for spinal support.

It is therefore a primary object of the present invention to provide a unique garment that provides spinal support for a four-legged animal having an elongated spine.

It is also an important object of the present invention to provide a comfortable snugly fitting garment for use by a four-legged animal having an elongated spine that provides support to the spine in order to forestall or prevent deterioration of the spine.

It is a further important object of the present invention to provide a comfortable snugly fitting garment for use by a four-legged animal having an elongated spine that may be used to treat spinal disorders in such animals.

It is another object of the present invention to provide a spinal support garment for use by four-legged animals having elongated spines, said garment having a plurality of elongated parallel pockets for receiving corresponding rigid stays to relieve stress and pressure from the animal's spine.

It is another object of the present invention to provide a spinal support garment for use by four-legged animals having elongated spines, said garment having a reinforced area along the spine to relieve stress and pressure from the animal's spine.

Other objects of the invention will be apparent from the detailed descriptions and the claims herein.

DETAILED DESCRIPTION OF THE DRAWINGS

Figure 1:
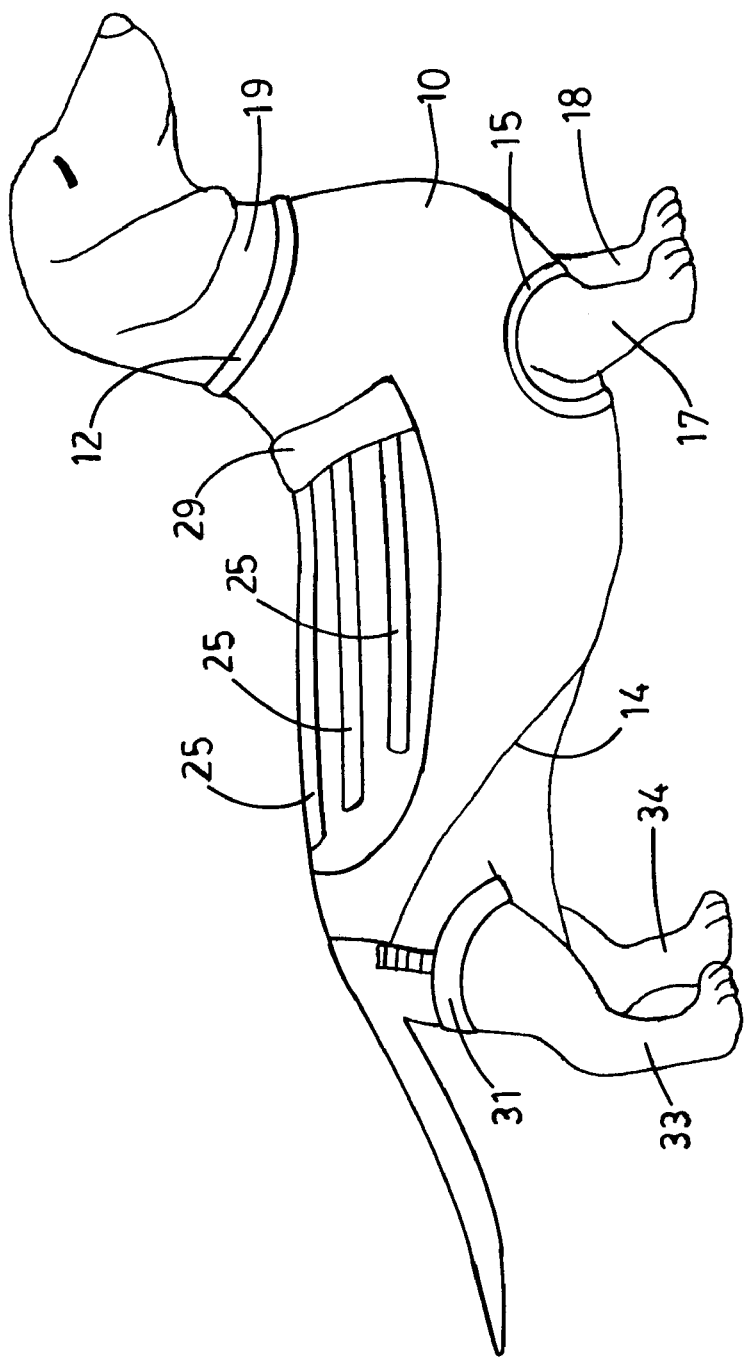
FIG. 1 is a perspective view of a dachshund dog wearing the support garment of the present invention.
Figure 2:
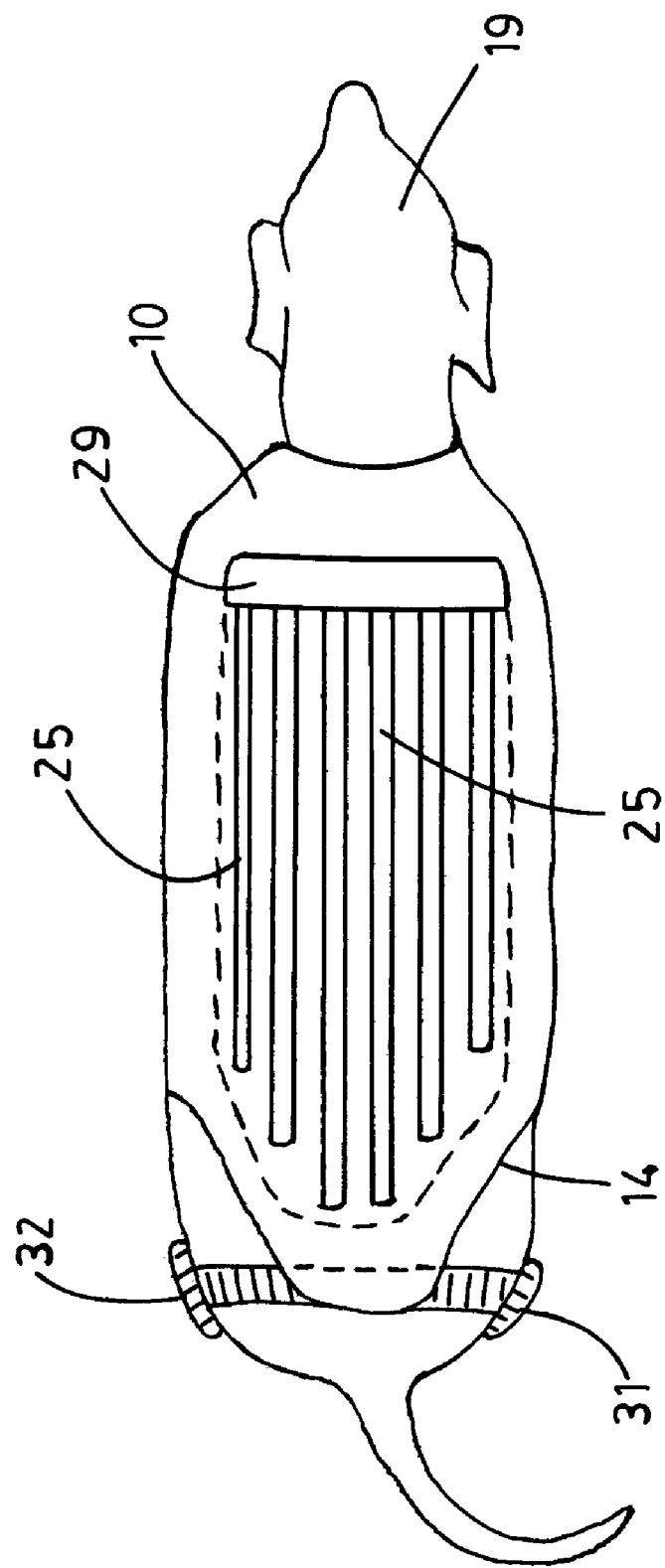
FIG. 2 is a top view of the dog of FIG. 1.
Figure 4:
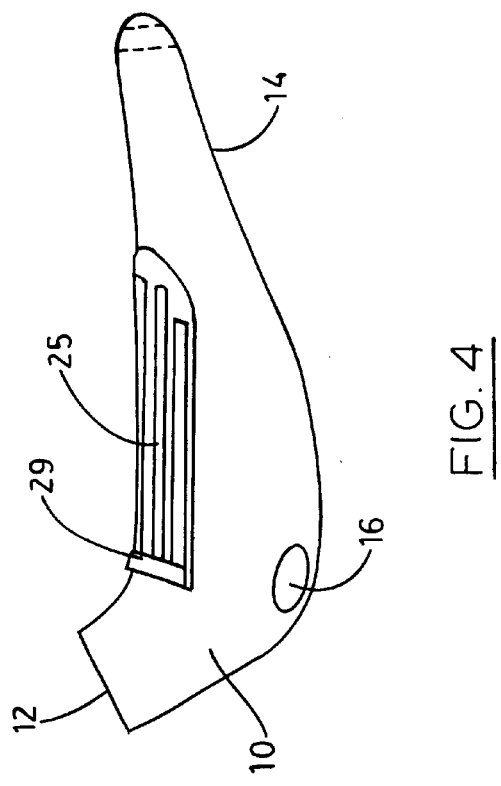
FIG. 4 is a side view of the garment of the present invention without the rear loops.
Figure 7:
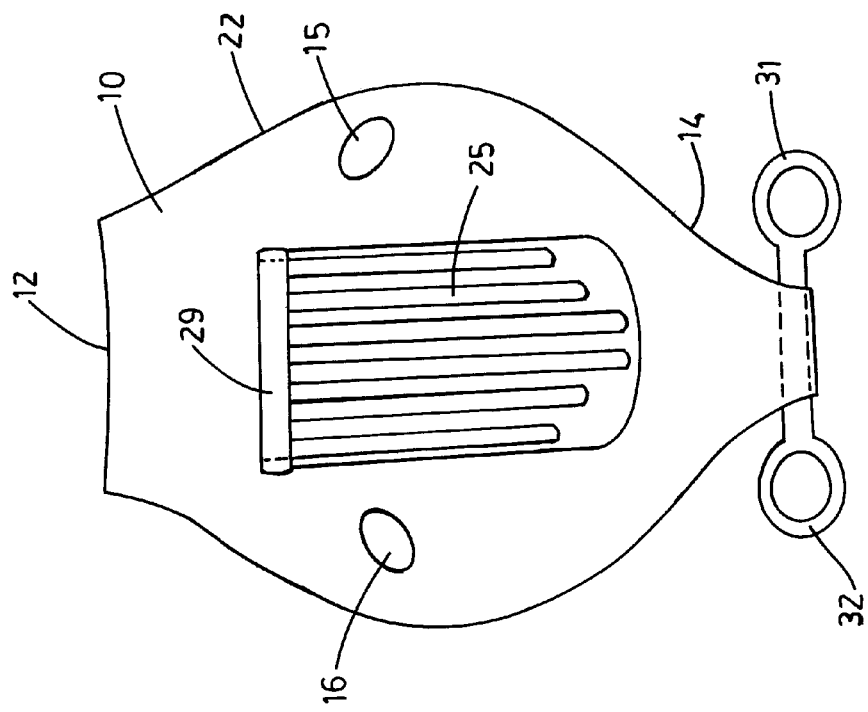
FIG. 7 is a top view of the garment of the present invention (in sewing pattern form) before it is attached together.
Figure 6:
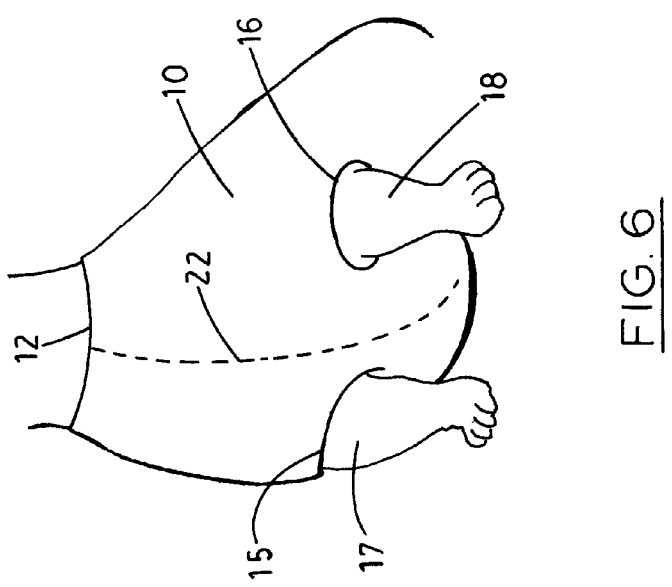
FIG. 6 is a close up view showing the front of the garment on a dachshund.

Referring to the drawings wherein like reference characters designate like or corresponding parts throughout the several views, and referring particularly to FIGS. 1, 2 and 7, it is seen that the invention includes a garment body 10 made of flexible tight-fitting fabric that is stitched, seamed or otherwise fastened together at 22 to form an elongated sleeve having a head and neck opening 12 at one end, and a larger rear opening 14 at the opposite end. A pair of front openings 15 and 16 are provided for receiving the front legs 17 and 18 of an animal, such as the dachshund 19 shown in FIG. 1.

Figure 3:
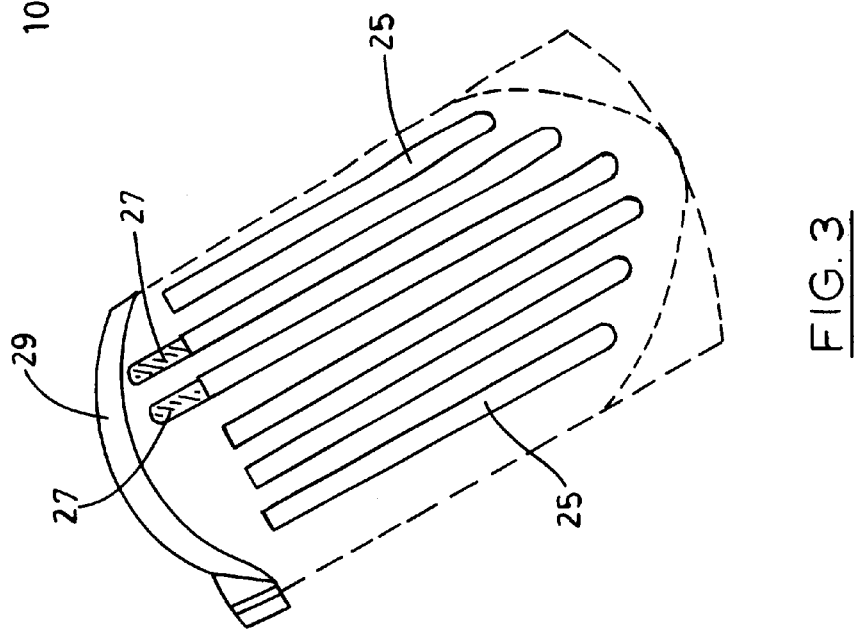
FIG. 3 is a perspective view of the garment of the present invention showing the support slats and pockets, without the rear loops.
Figure 5:
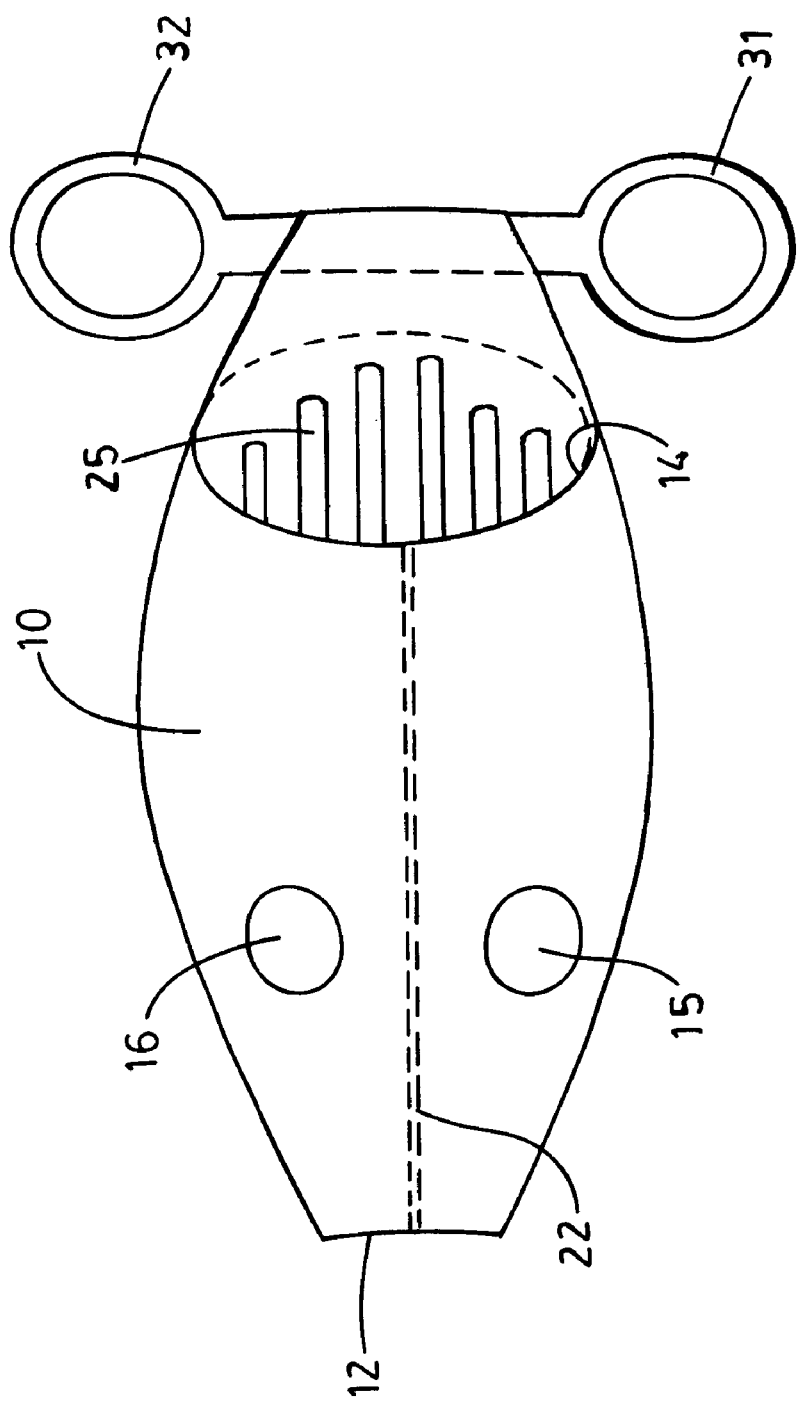
FIG. 5 is a bottom view of the garment of the present invention.

Along the top of the garment 10, a plurality of elongated parallel pockets 25 are provided. Each pocket 25 is closed along its length and at one end, and open at the opposite end. Each pocket is designed to receive a rigid slat or stay 27 to provide support in parallel with the animal's spine. It is preferable, although not necessary, that the open ends of all of the pockets 25 be at the same place. In this way, a single fold over fabric flap 29 (see FIG. 3) may be used to cover the open ends of the pockets 25, keeping the stays 27 inside from sliding out as shown in FIGS. 1 and 2.

A pair of loops 31 and 32 made of flexible material (such as elastic) are provided at the rear 14 of garment 10. These loops are designed to be stretchably engaged around the rear legs 33 and 34 of the animal to hold the garment in place, as shown in FIG. 1.

In an alternative embodiment (not shown), an additional panel of sturdy fabric 36 may be provided on body 10 underneath or instead of pockets 25. A rigid sheet of material may be sewn between this panel and the fabric of the body. This embodiment is capable of providing support even without the pockets 25 and stays 27. Additional support is provided when stays and pockets are provided with this embodiment.

Seam 22 may be permanently attached using a stitch or seam, or it may be detachable in the form of snaps, buttons, zippers or attachable hooks-and-loops (Velcro).

Pockets 25 are preferably longest along the top of the garment, most closely associated with the spine, the pockets along the sides having taperingly shorter lengths the farther they are from the top.

The support stays 27 are preferably made of semi-rigid plastic in order to provide some freedom of movement to the animal while also providing support; however, these stays may be made of more rigid plastic, wood or metal to provide additional support with less flexibility. Any combination of stays may also be employed in order to achieve the desired result. As examples for illustration only and without limitation: (a) the pockets may be alternatingly filled with rigid and semi-rigid stays; or, (b) every other pocket may be empty; or (c) the upper pockets may be provided with rigid stays, a next group of pockets may be provided with semi-rigid stays, and the remaining pockets may be provided with no stays.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. An animal support garment comprising a sleeve made of flexible fabric for snug fitment around the body of an animal, said sleeve having a head opening at one end and a larger rear opening at the opposite end, a pair of smaller openings near the head opening for the front legs of the animal, a plurality of longitudinal parallel pockets provided on the outside of said sleeve, said pockets being positioned generally in parallel with the spine of the animal, a plurality of corresponding stays for insertion into said pockets, a fold over flap for securing said stays inside said pockets and a longitudinal seam in said sleeve opposite said stays, said seam being closable using at least one fastener selected from the group of buttons, snaps, zippers, and attachable hooks-and-loops.

2. The garment of claim 1 wherein said pockets are elongated, the centermost pockets having the greatest length, and adjacent pockets having gradually shorter lengths.

3. The garment of claim 2 wherein said stays have lengths which correspond to the lengths of the elongated pockets on the garment.

4. The garment of claim 3 wherein said stays are made of a semi-rigid material.

5. The garment of claim 3 wherein said stays are made of a rigid material.

6. The garment of claim 4 wherein a pair of loops made of flexible material are attached to the rear opening of the garment for engagement with the rear legs of the animal.

7. An animal support garment comprising a sleeve made of flexible fabric for snug fitment around the body of an animal, said sleeve having a head opening at one end and a larger rear opening at the opposite end. a pair of smaller openings near the head opening for the front legs of the animal, a plurality of longitudinal parallel pockets provided on the outside of said sleeve, said pockets being positioned generally in parallel with the spine of the animal, a plurality of corresponding stays for insertion into said pockets, a fold over flap for securing said stays inside said pockets, and a pair of loops made of flexible material attached to the rear opening of the garment for engagement with the rear legs of the animal wherein said pockets are elongated the centermost pockets having the greatest length, and adjacent pockets having gradually shorter lengths, said stays being made of a semi-rigid material and having lengths which correspond to the lengths of the elongated pockets on the garment and wherein a longitudinal seam is provided in said sleeve opposite said stays, said seam being closable using at least one fastener selected from the group of buttons, snaps, zippers, and attachable hooks-and-loops.

* * * * *